Aug. 14, 1928.

G. H. WHITELEY, JR 1,680,312

METHOD AND MEANS FOR MOLDING ARTIFICIAL TEETH

Filed April 22, 1926

Inventor
George H. Whiteley Jr.

By [signature]

Attorney.

Patented Aug. 14, 1928.

1,680,312

UNITED STATES PATENT OFFICE.

GEORGE H. WHITELEY, JR., OF YORK, PENNSYLVANIA, ASSIGNOR TO THE DENTISTS' SUPPLY COMPANY, A CORPORATION OF NEW YORK.

METHOD AND MEANS FOR MOLDING ARTIFICIAL TEETH.

Application filed April 22, 1926. Serial No. 103,703.

Heretofore it has been customary to mold artificial posterior teeth, including molars and bicuspids, from porcelain material and, preliminary to vitrifying them, to drill lateral holes through their walls mesio-distally, while the molded teeth are in biscuited condition, so that the teeth in their final vitrified form shall be provided with lateral anchoring recesses or holes as well as with the molded recesses in the cervical ends for the volcanite of the plate denture. In providing the lateral anchoring holes great care is required on the part of the drilling operatives to insure the same to be properly positioned and accurately directed and, in view of the molded article being in the biscuited condition, the fragility of it causes breakage and loss thereby. Furthermore, the method of manufacture is slow and costly, and the fine dust produced by the drilling is injurious to the worker.

The object of my invention is to produce a diatoric artificial posterior tooth of the same general nature but with the lateral anchoring apertures or holes molded in the neck or cervical part of the tooth body during the molding operation of the tooth from the porcelain material.

My invention consists of the method and means for making posterior diatoric teeth of the character described without drilling, together with the artificial tooth produced thereby, as fully set out hereinafter and pointed out in the claims.

Figure 1:
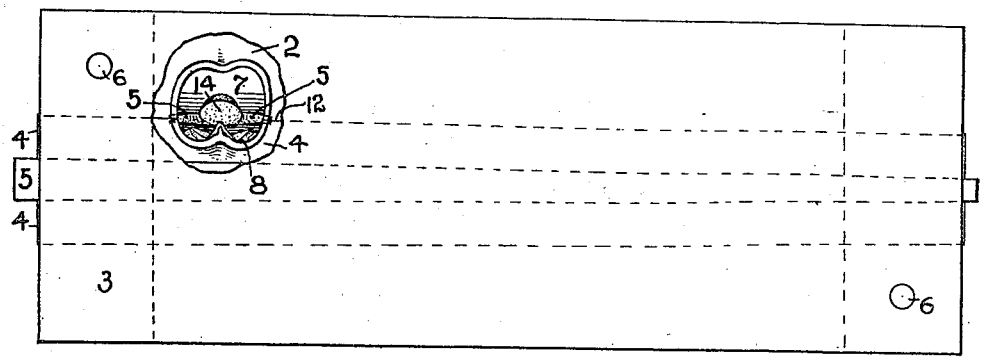
Figure 2:
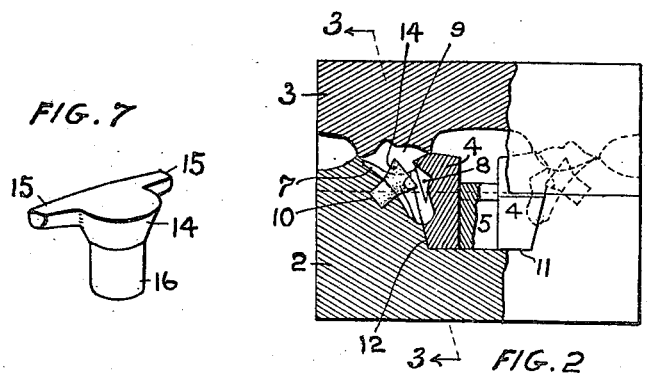
Figure 3:
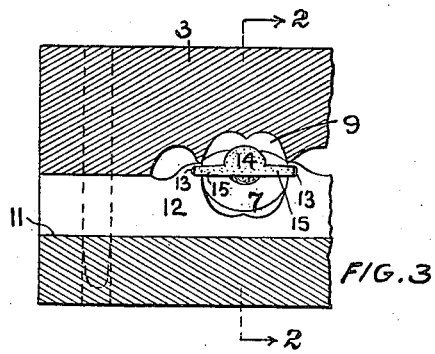
Figure 4:
Figure 5:
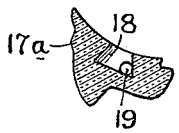
Figure 6:
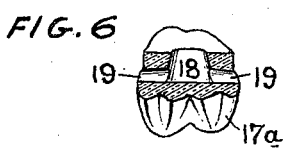

My invention will be better understood by reference to the accompanying drawings, in which: Fig. 1 is a plan view of a mold (with a portion broken away) adapted for use in molding teeth under my improved method; Fig. 2 is an end view of the same, with a portion in section, on line 2—2 of Fig. 3; Fig. 3 is a vertical section of one end of the mold structure, taken on line 3—3 of Fig. 2; Fig. 4 is a side view of a biscuited tooth as molded with the combustible core part in position; Fig. 5 is a vertical section of the vitrified tooth when the core part has been burned out; Fig. 6 is a vertical section of the tooth shown in Fig. 5, taken in a mesio-distal direction; and Figs. 7 and 8 are perspective views of the combustible cores adapted for use with the mold parts.

The general construction of the mold may embody the features heretofore found suitable for molding posterior teeth and, as shown, consists of the lower mold part 2, an upper mold part 3 and two lateral mold parts 4, 4, pressed into operating contact with the mold part 2 by means of a removable wedge 5. The mold part 3 is shaped to cooperate with the mold parts 2 and 4 to provide a suitable space in which the porcelain material is molded to constitute the tooth structure. As shown, the mold parts are each formed with recesses, namely, the recess 7 in the mold part 2, recess 9 in the mold part 3, and recess 8 in the mold part 4, said recesses opening into each other to provide a unitary space having the desired configuration.

12 represents the surface contact between the mold parts 2 and 4 when said parts are assembled preliminary to the closure of the mold by the removable upper part 3. The positioning of the mold part 3 upon the mold part 2 is assured by means of the dowel pins 6, as customary.

Figure 7:
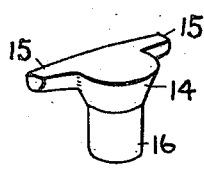
Figure 8:
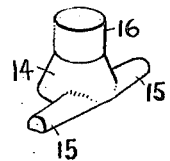

The core to be molded into the tooth body is clearly shown in Figs. 7 and 8 and comprises a conical body 14 terminating at its small end in a cylindrical shank 16 and having at its larger end laterally projecting arms (preferably tapering) 15, said arms being two in number and extending in opposite directions and preferably arranged tangentially to the curvature of the body part 14.

As will be seen from Fig. 2, the recess 7 of the mold part 2 has its bottom surface provided with a hole 10 in which the shank portion 16 of the core is snugly received, whereby the body part 14 projects into the tooth space. Furthermore, the total distance from end to end of the lateral arms 15 is slightly greater than the total width of the tooth space, as shown in Fig. 3, and the extreme end portions of said arms are received in recesses 13 in the mold surface 12, whereby said arms 15 are properly positioned and are, morever, clamped between the two walls of the mold parts 2 and 4. While the core is thus centralized by the hole 10 and the arms are properly positioned and held by the recesses 13, the main portion of the core constituted by the parts 14 and 15 are arranged within the tooth space and may be surrounded by the porcelain material of which the tooth is to be molded.

When the porcelain material is applied to the several mold parts 2, 3 and 4, in the usual manner, and said parts are assembled with the core in position, the excess of the porcelain material is squeezed out and the tooth form molded firmly about the core. Before being removed, the molded tooth form is dried so as to produce what is known as a biscuited tooth and when the same is removed from the mold, the tooth, together with the core, will be as indicated in Fig. 4 in which the core part 16 will project from the cervical end of the tooth while the lateral arms of the core will extend slightly through the side walls of the tooth body.

As before stated, the core structure is formed of combustible material which will become consumed when the tooth is subjected to vitrifying temperature. When the tooth is vitrified and the core burned or gasified, the finished tooth structure is, as shown in Figs. 5 and 6, wherein 17ª is the tooth body, 18 is the tapering recess formed in the cervical end of the tooth, and 19 are the lateral apertures opening from the recess 18 and extending entirely through the tooth walls, as is clearly seen from Fig. 6. It will be further seen that these lateral apertures 19 are preferably somewhat tapering from the inside outward and that the recess 18 provides annular undercut walls, and thus insure a strong connection with the vulcanite of the denture.

The combustible core is desirably made in a manner in which full combustion will result when vitrifying the tooth, so as to leave the recess 18 and the holes 19 perfectly clean from ash or deposit, whereby no hand work will be required to clear out said parts. I have found that finely ground wood fibre molded into shape with a small amount of vegetable paste gives satisfactory results, especially where the cores are molded under pressure, and consequently with a minimum amount of binder. The combustion of the wood or carbonaceous element of the core may be facilitated by incorporating with it oxidizing means which would not be affected by the minor drying temperature, and in this connection a small quantity of alkaline nitrates or manganese may be employed, either in place of the binder or associated with it, when molding the cores.

In referring to the cores as being combustible, I include cores of any material which will under the application of sufficient temperature either burn or gasify, or both.

I do not restrict myself to any particular shapes of the teeth nor to the construction of the mold, except in so far as it is adapted to receive and support the cores, and while it is customary to make molds adapted to simultaneously mold a plurality of tooth forms, I do not limit myself in this respect, as my invention is applicable to a mold having capacity for molding only a single tooth at one time.

I have described my improved method and means in that particularity which I deem to be the best exposition of my invention, and that which I prefer in commerical practice, but I do not restrict or confine myself to the minor or secondary details, as such are susceptible of modification which may be resorted to as matters of mechanical skill and without a departure from the spirit of the invention.

Having now described my invention, what I claim and desire to secure by Letters Patent is:

1. Molding means for molding artificial teeth, which consists of a three-part mold two of which parts are detachably clamped in fixed relation and the other part in detachable loose relation and wherein the two parts which are clamped in fixed relation provide separated clamping recesses opening into their line of contact and one of them has a core receiving socket, and a combustible core having a shank fitted to the core receiving socket of the first mentioned mold parts and having its body part projecting into the tooth space, said core also provided with laterally extending arms the ends of which are respectively clamped in the recesses between the first mentioned two mold parts which are detachably clamped in fixed relation and about which core the porcelain material is molded, said core adapted to be subsequently burned out when vitrifying the tooth whereby said tooth will be properly molded with a recess in its cervical end and with lateral passages opening from said recess through the outer walls of the body of the tooth.

2. A plurality of metal mold parts adapted in their molding association to provide a tooth space and two clamping recesses spaced apart, in combination with a fusible core having a body part projecting from contact with the surface of one of the mold parts upwardly into the tooth space and having the projecting end provided with laterally extending arms the ends of which are clamped in recesses in said mold parts arranged between the juncture of two of the mold parts, and about which core the porcelain material to constitute the tooth body is molded.

3. The invention according to claim 2, wherein the body of the core is tapered with its largest end within the tooth space and integral with the laterally extending arms.

4. The invention according to claim 2, wherein the core has its laterally extending arms integral with the body of the core and projecting therefrom in a tangential direction.

5. The invention according to claim 2, wherein further, the core is provided with a shank extending into a socket in one of the mold parts so that the core has a definite three point support with the mold parts.

6. The invention according to claim 2, wherein notches are provided between two of the mold parts and into which the ends of the laterally projecting arms of the core are received.

7. A core part for molding artificial teeth formed of combustible material capable of buring or vaporizing under high temperature, said core having a body part terminating in a shank, said body part at its end farthest from the shank provided with laterally extending arms of relatively small transverse cross section as comparted to the body part and shank.

8. The invention according to claim 7, wherein further, the body part is tapered and the laterally extending arm portions are tangentially arranged at the end of the body part most distant from the shank.

9. The invention according to claim 7, wherein further, the laterally extending arms are tangentially arranged on the body part and are also tapering in cross section.

10. The method of molding posterior artificial teeth, which consists in molding the general shape of the tooth between three suitable cooperating metallic mold parts, introducing into the mold space between said mold parts a core of combustible material and supporting said core at three spaced places one being a slight embedment in the inner wall of one of the mold parts and the other two steadying supports being through lateral extensions of the core having their ends arranged between the juncture of two of said mold parts so as to be disengageable when said mold parts are separated, whereby the core is positioned in one core part and clamped between a plurality of the mold parts during the molding of the porcelain material, thereafter drying the porcelain material with the core embedded therein, freely separating the molded tooth with the core attached by removing the clamping mold part from the mold part in which the core is slightly embedded, and finally subjecting the tooth and core to a vitrifying temperature for vitrifying the porcelain material and burning out the material of the core, so that the cervical end of the tooth is provided with a recess and said recess continued in laterally molded passages to the outside of the body of the tooth in a mesio-distal direction.

In testimony of which invention, I hereunto set my hand.

GEORGE H. WHITELEY, Jr.